United States Patent
Sugino et al.

(10) Patent No.: US 10,077,013 B2
(45) Date of Patent: Sep. 18, 2018

(54) ELECTRIC WIRE PROTECTING PIPE AND WIRE HARNESS

(71) Applicant: Sumitomo Wiring Systems, Ltd., Yokkaichi, Mie (JP)

(72) Inventors: Hidetoshi Sugino, Mie (JP); Hidehiko Iwakawa, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/525,149

(22) PCT Filed: Nov. 28, 2014

(86) PCT No.: PCT/JP2014/081533
§ 371 (c)(1),
(2) Date: May 8, 2017

(87) PCT Pub. No.: WO2016/075839
PCT Pub. Date: May 19, 2016

(65) Prior Publication Data
US 2017/0313267 A1    Nov. 2, 2017

(30) Foreign Application Priority Data
Nov. 12, 2014   (JP) .................. 2014-229543

(51) Int. Cl.
*B60R 16/02*   (2006.01)
*H02G 3/04*   (2006.01)

(52) U.S. Cl.
CPC ....... *B60R 16/0215* (2013.01); *H02G 3/0468* (2013.01)

(58) Field of Classification Search
CPC . H02G 3/22; H02G 3/04; B60R 16/02; B60R 16/0215; H01B 7/00
(Continued)

(56) References Cited

U.S. PATENT DOCUMENTS

2011/0083899 A1*   4/2011   Mori ................... B60R 16/0215
                                                                       174/72 A
2011/0132638 A1    6/2011   Oga
(Continued)

FOREIGN PATENT DOCUMENTS

JP   2007012519 A   1/2007
JP   2010051042 A   3/2010
(Continued)

OTHER PUBLICATIONS

International Search Report and Written Opinion for application No. PCT/ JP2014/ 081533 dated Dec. 22, 2014, 7 pages.
(Continued)

*Primary Examiner* — Michael F McAllister
(74) *Attorney, Agent, or Firm* — Reising Ethington, P.C.

(57) ABSTRACT

A wire harness and an electric wire protecting pipe that can protect electric wires without including a separate component for shielding a drain hole. The electric wire protecting pipe is a resin pipe into which electric wires are insertable, and a lower wall portion is provided integrally with a projecting portion that projects outward, and a circumferential wall portion of the projecting portion is provided with a drain hole. According to such a configuration, the electric wires are protected from flying gravel, splashing water, or the like, by the projecting portion that is formed integrally with the electric wire protecting pipe, and thus the electric wires can be protected without including a separate component for shielding the drain hole.

7 Claims, 16 Drawing Sheets

(58) Field of Classification Search
USPC .................................................... 174/70 C
See application file for complete search history.

(56) References Cited

U.S. PATENT DOCUMENTS

| | | |
|---|---|---|
| 2013/0008711 A1 | 6/2013 | Toyama |
| 2015/0136481 A1 | 5/2015 | Inao |
| 2015/0251609 A1 | 9/2015 | Sugimoto |
| 2016/0144807 A1* | 5/2016 | Inao .................... B60R 16/0215 174/72 A |

FOREIGN PATENT DOCUMENTS

| | | |
|---|---|---|
| JP | 2011193677 A | 9/2011 |
| JP | 2014042408 A | 3/2014 |
| JP | 2014103810 A | 6/2014 |

OTHER PUBLICATIONS

English Translation of International Search Report for application No. PCT/ JP2014/ 081533 dated Dec. 22, 2014, 2 pages.
International Preliminary Report on Patentability for application No. PCT/ JP2014/ 081533 dated Feb. 17, 2015, 9 pages.

* cited by examiner

ELECTRIC WIRE PROTECTING PIPE AND WIRE HARNESS

CROSS REFERENCE TO RELATED APPLICATIONS

This application claims the priority of Japanese patent application JP2014-229543 filed on Nov. 12, 2014, the entire contents of which are incorporated herein.

TECHNICAL FIELD

The present invention relates to an electric wire protecting pipe and a wire harness.

BACKGROUND ART

Conventionally, a technique is known with which in order to protect a wire harness that is routed underneath the floor of a vehicle, an electric wire that is a part of the wire harness is inserted into an electric wire protecting pipe and is attached to the vehicle. As described in Patent Document 1 (JP 2007-12519A), for example, in order to prevent water drops from accumulating inside the electric wire protecting pipe, some electric wire protecting pipes are provided with drain holes. A lower wall of the electric wire protecting pipe is provided with a drain hole that opens downward. Moreover, in order to protect electric wires in the electric wire protecting pipe from flying gravel, splashing water, or the like while the vehicle is moving, the electric wire protecting pipe is provided with a shielding component that can cover the drain hole from the outside.

SUMMARY

However, providing the component for shielding the drain hole in order to protect the electric wire from flying gravel or the like while the vehicle is moving, as described above, was believed not to be desirable due to high costs and the like.

The present design was made based on the above-described circumstances, and an object thereof is to provide a wire harness and an electric wire protecting pipe that can protect an electric wire without including a separate component for shielding a drain hole.

An electric wire protecting pipe of the present design is a resin pipe into which electric wires are insertable, a lower wall portion disposed on a lower side when the electric wire protecting pipe is attached to a vehicle is provided, by blow molding or vacuum molding, integrally with a projecting portion that projects outward, and a circumferential wall portion of the projecting portion is provided with a drain hole that is open in a direction intersecting a direction from the inside to the outside of the electric wire protecting pipe.

A wire harness of the present design is obtained by inserting a plurality of electric wires into the electric wire protecting pipe.

According to the present design, an opening that enables communication between the inside and the outside of the electric wire protecting pipe is covered by the projecting portion formed integrally with the electric wire protecting pipe, and the electric wires are protected from flying gravel, splashing water, or the like, and thus the electric wires can be protected without including a separate component for shielding the drain hole.

DESCRIPTION OF EMBODIMENTS

A preferred embodiment will be described below.

An electric wire protecting pipe may be configured such that the drain hole is formed in the wall portion disposed on the rear side of the circumferential wall portion of the projecting portion when the electric wire protecting pipe is attached to a vehicle. Such a configuration makes it possible to prevent draining properties from deteriorating due to wind received while the vehicle is moving.

Also, the electric wire protecting pipe may include a bending pipe portion that is easily bent and is provided with protruding portions and recessed portions that are alternately continuous with each other in the axial direction, and a straight pipe portion that is flat and is not easily bent in the axial direction. With such a configuration, the straight pipe portion does not sag by its own weight even if the electric wire protecting pipe is arranged approximately horizontally, and thus it is possible to prevent use of numerous clamps for fixing for preventing the pipe from sagging and to prevent an increase in the number of clamp attachment steps.

Also, the electric wire protecting pipe may have a configuration in which a cross section that is approximately orthogonal to the axial direction has a flat shape. Such a configuration makes it possible to reduce a height, compared to cases where the cross section has a circular shape, for example, and thereby is advantageous in cases where there is a limitation on the height of an arrangement space.

Also, the electric wire protecting pipe may have a configuration in which a lower wall of the projecting portion is inclined downward toward the drain hole. With such a configuration, water is smoothly released to the outside due to the inclination of the lower wall of the projecting portion, and thus draining properties can be improved.

Also, the electric wire protecting pipe may include a bending pipe portion that is easily bent and is provided with protruding portions and recessed portions that are alternately continuous with each other in the axial direction, and a straight pipe portion that is flat and is not easily bent in the axial direction, and the thickness of the lower wall portion may be greater than the thickness of a left wall portion and a right wall portion that are disposed on the left and right sides. With such a configuration, the strength of the lower wall portion that flying gravel or the like tends to hit while the vehicle is moving is high, and the left wall portion and the right wall portion that are disposed on the left and right sides are likely to extend, which can prevent flying gravel or the like while the vehicle is moving from forming a hole in the electric wire protecting pipe, and the bending pipe portion can easily undergo bending deformation in the horizontal direction.

Embodiment 1

Hereinafter, Embodiment 1 will be described in detail with reference to FIGS. 1 to 10.

Figure 1:
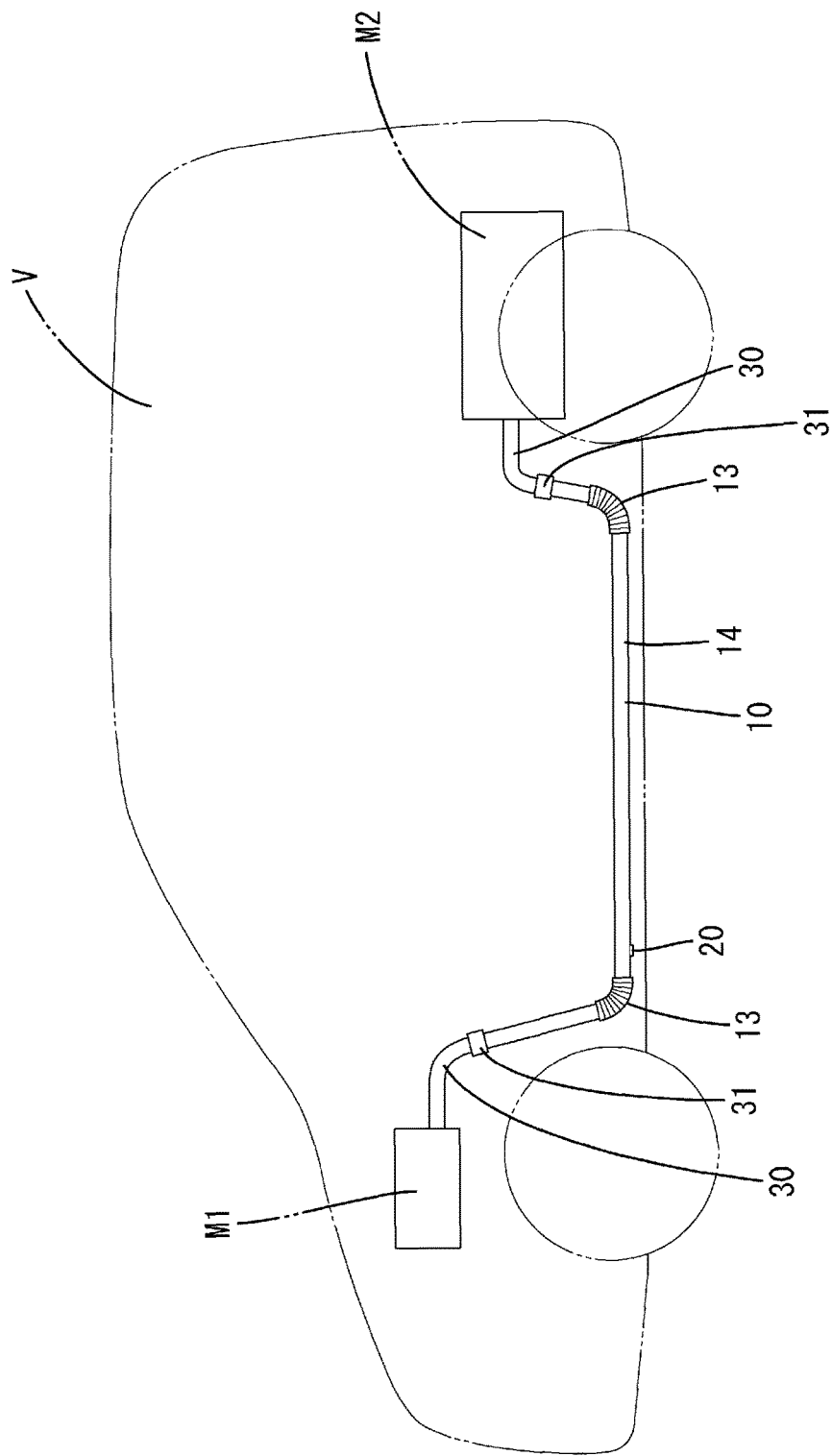
FIG. 1 is a schematic diagram showing an electric wire protecting pipe in Embodiment 1 in a state in which the electric wire protecting pipe is attached to a vehicle.
Figure 2:
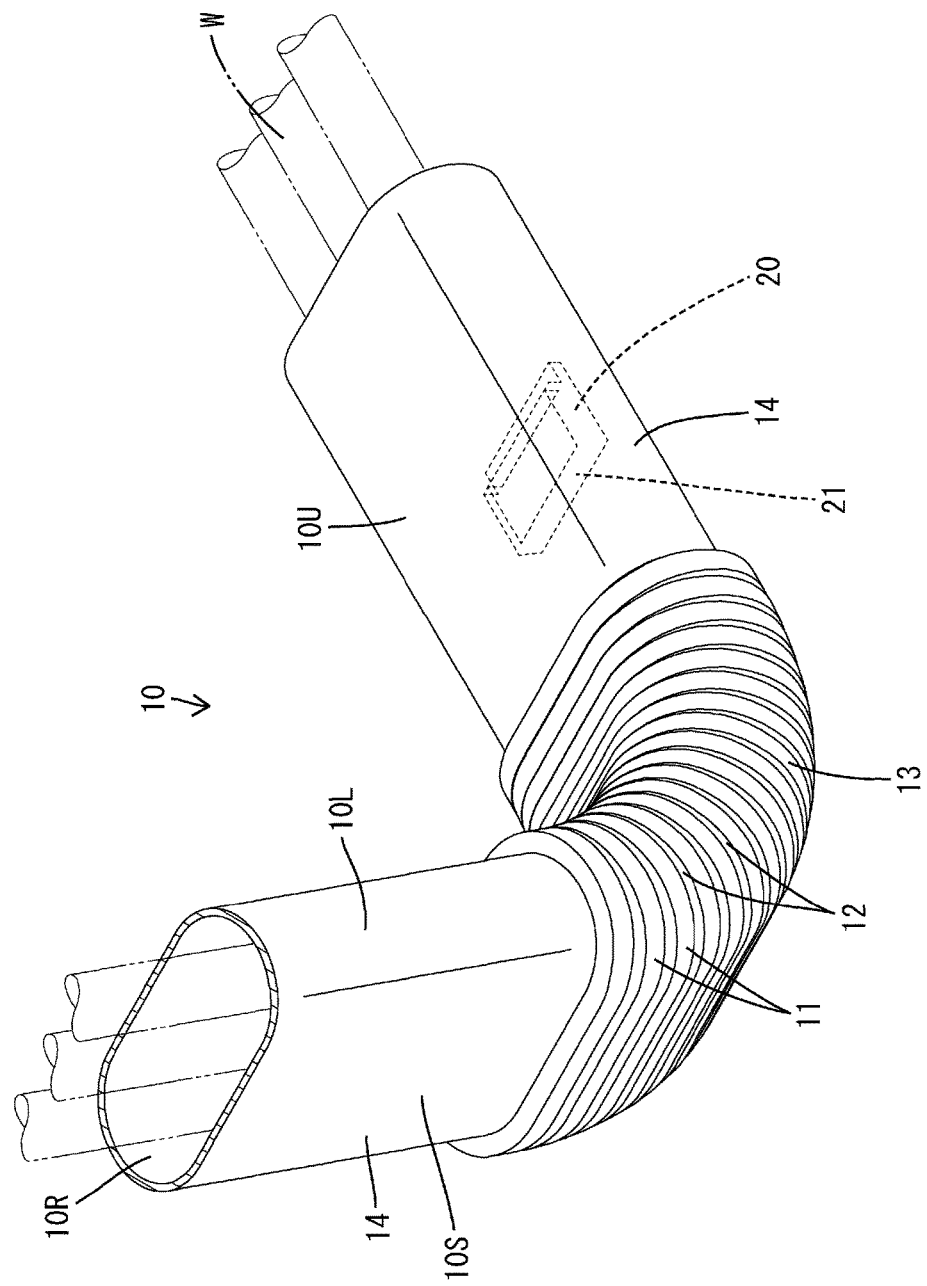
FIG. 2 is a partially enlarged perspective view showing the vicinity of a drain portion in a state in which the electric wire protecting pipe is attached to the vehicle.

As shown in FIG. 1, an electric wire protecting pipe 10 in this embodiment is attached to a vehicle V, and a plurality of electric wires W that are part of a wire harness for connecting a device M1 arranged inside an engine room located in a front portion of the vehicle V and a device M2 arranged in a room located in a rear portion of the vehicle V are inserted into the electric wire protecting pipe 10. The wire harness is routed from the front inside the vehicle V to the rear inside the vehicle V underneath a floor of a vehicle body that serves as the outer side of a frame of the vehicle body.

Exterior components 30 such as a corrugate tube are mounted on those portions of the electric wires W that are drawn to the outside from the two end portions of the electric wire protecting pipe 10. The end portions of the exterior components 30 cover the end portions of the electric wire protecting pipe 10, and tape rolls 31 are wound around joints between the exterior components 30 and the electric wire protecting pipe 10. In the following description, it is assumed that, in each constituent member, when the electric wire protecting pipe 10 is attached to the vehicle V, "front" refers to the side facing the front in a traveling direction (left side in FIG. 1), "rear" refers to the side facing the rear (right side in FIG. 1), "top" refers to the upper side, and "bottom" refers to the lower side in FIG. 1.

Figure 4:
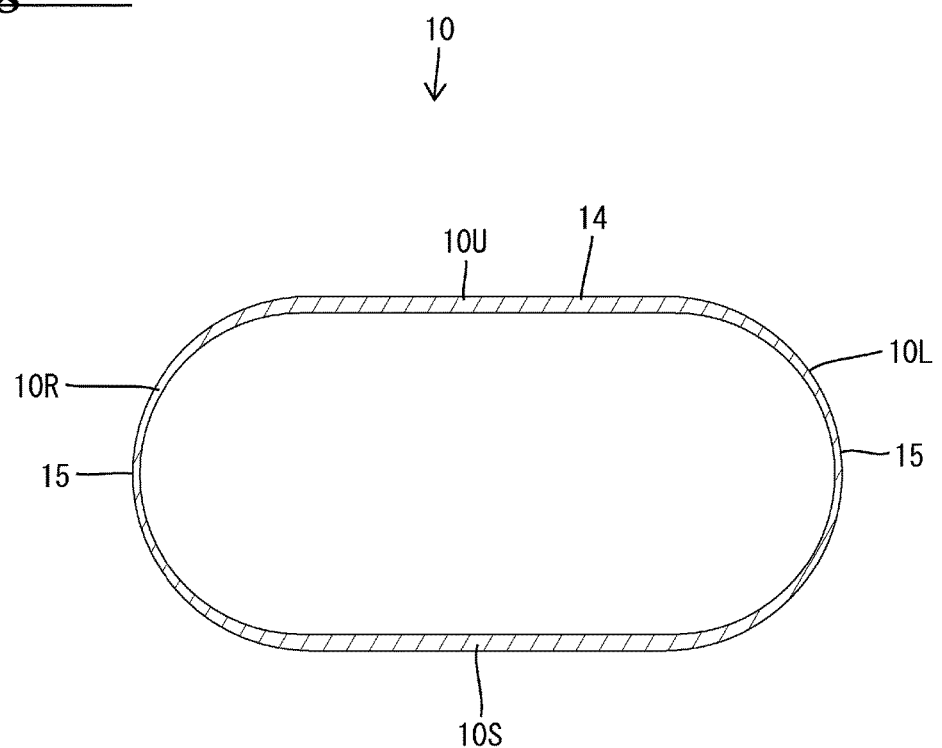
FIG. 4 is a cross-sectional view of the electric wire protecting pipe, corresponding to a cross section at a position A-A in FIG. 3.

The electric wire protecting pipe 10 is made of a synthetic resin, and as shown in FIG. 4, its cross section approximately orthogonal to the axial direction has an obround shape, whose size in the vertical direction is smaller than its size in the horizontal direction. The upper and lower surfaces of the electric wire protecting pipe 10 are flat surfaces that are approximately parallel to each other, and its left and right surfaces are curved surfaces that each curve to have an arc shape.

Figure 3:
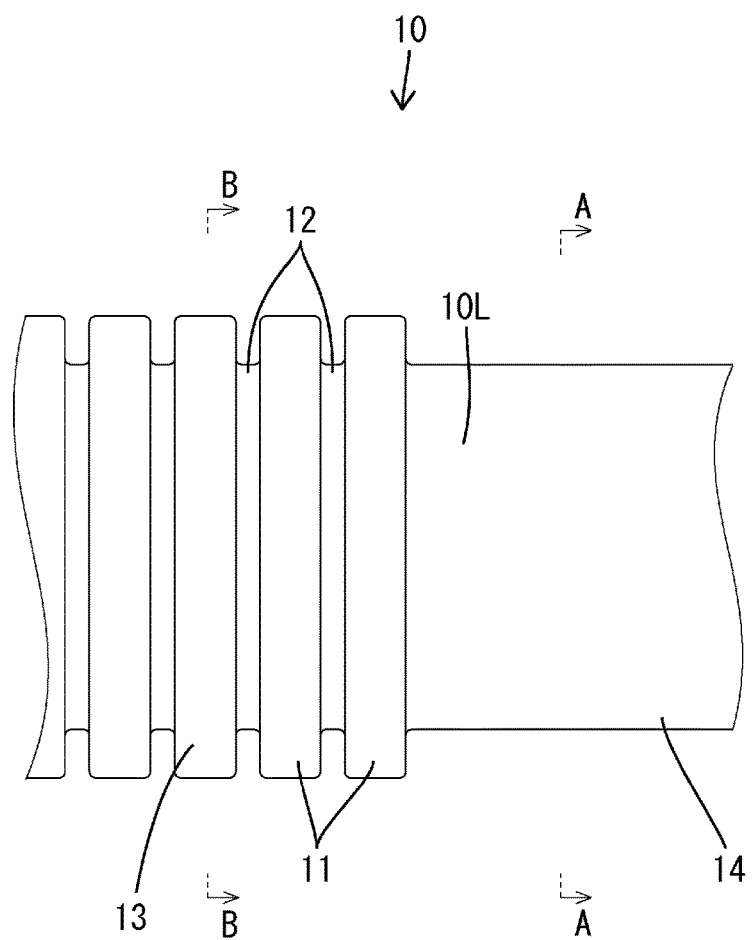
FIG. 3 is a partially enlarged side view of the electric wire protecting pipe, showing a bending pipe portion and a straight pipe portion.

As shown in FIG. 3, the electric wire protecting pipe 10 includes a bending pipe portion 13 that is easily bent and is provided with protruding portions 11 and recessed portions 12 that are alternately continuous with each other in the axial direction, and a straight pipe portion 14 that is flat and is not easily bent in the axial direction.

As shown in FIG. 1, the bending pipe portion 13 has an accordion shape, and is provided at regions at which the electric wires W are bent. In this embodiment, the bending pipe portions 13 are provided at a position near a front end of the electric wire protecting pipe 10 and a position near a rear end thereof. The bending pipe portion 13 can be relatively easily bent in the vertical direction (up-down direction) and the horizontal direction (left-right direction). After the electric wires W are inserted into the electric wire protecting pipe 10, the electric wire protecting pipe 10 is bent three-dimensionally along a path for routing the electric wires W, and is attached to the vehicle V.

The straight pipe portion 14 does not have an accordion shape, and is not bent. The straight pipe portion 14 is formed linearly, and is provided between front and rear end portions of the electric wire protecting pipe 10 and the front and rear bending pipe portions 13. Portions provided between the bending pipe portions 13 are arranged approximately horizontally underneath the floor of the vehicle V.

Figure 5:
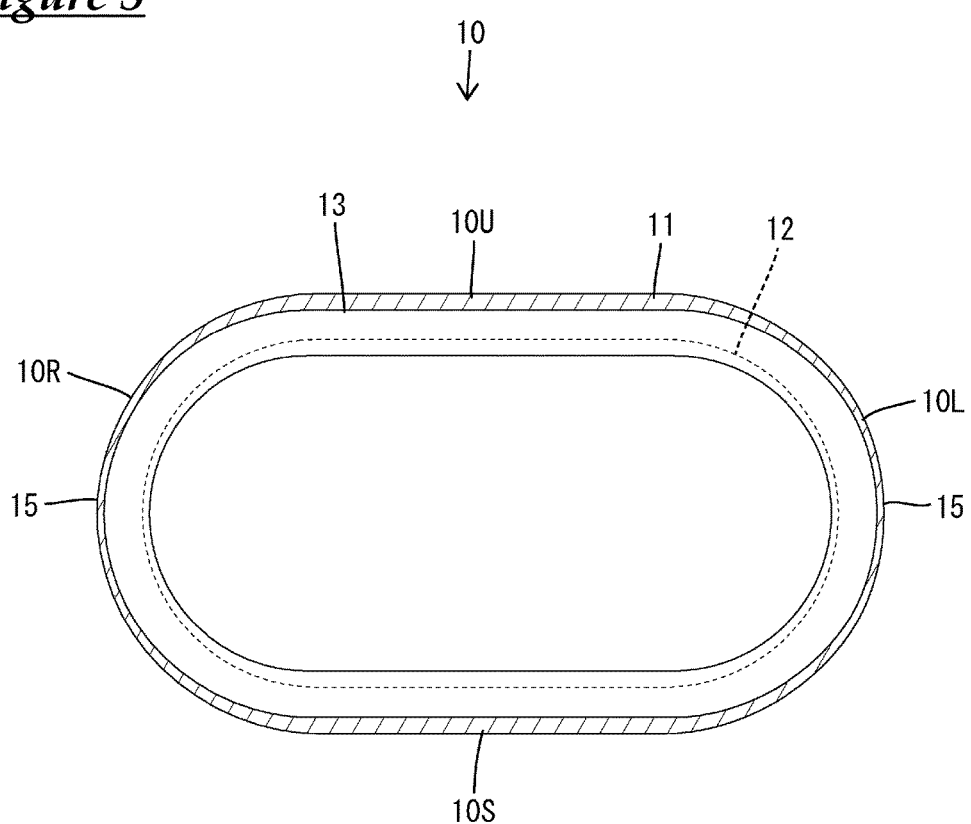
FIG. 5 is a cross-sectional view of the electric wire protecting pipe, corresponding to a cross section at a position B-B in FIG. 3.
Figure 6:
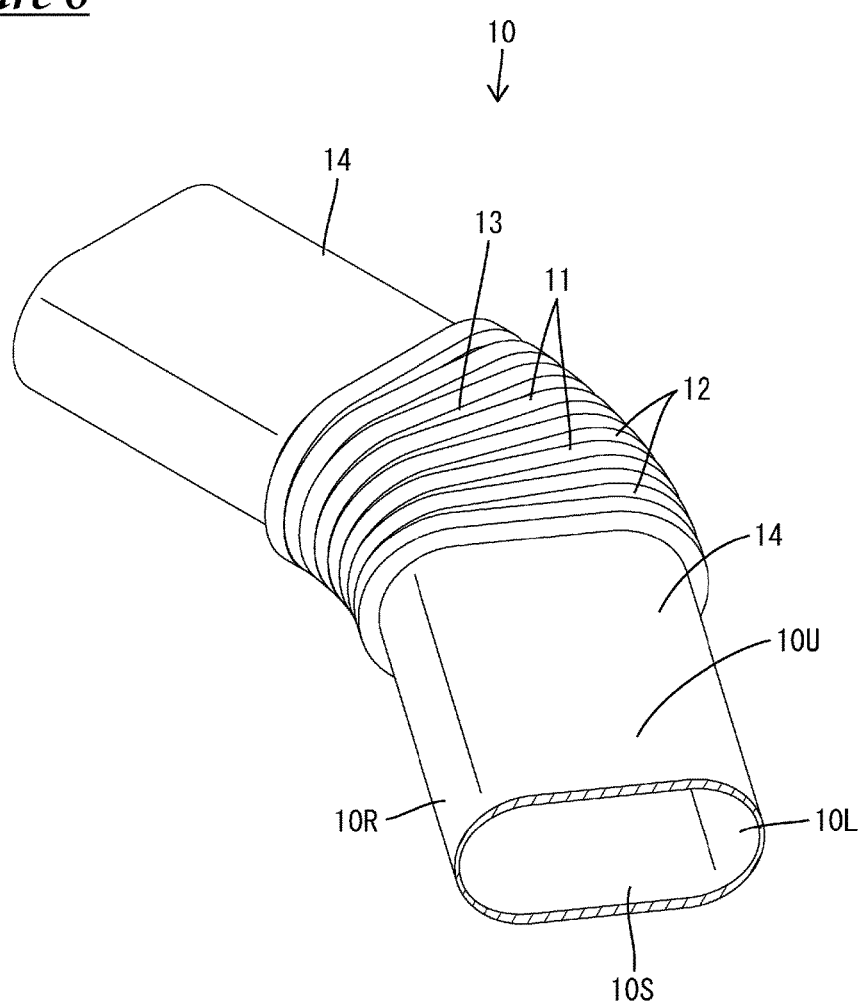
FIG. 6 is a partially enlarged perspective view of the electric wire protecting pipe showing a state in which the electric wire protecting pipe is bent in a horizontal direction.
Figure 7:
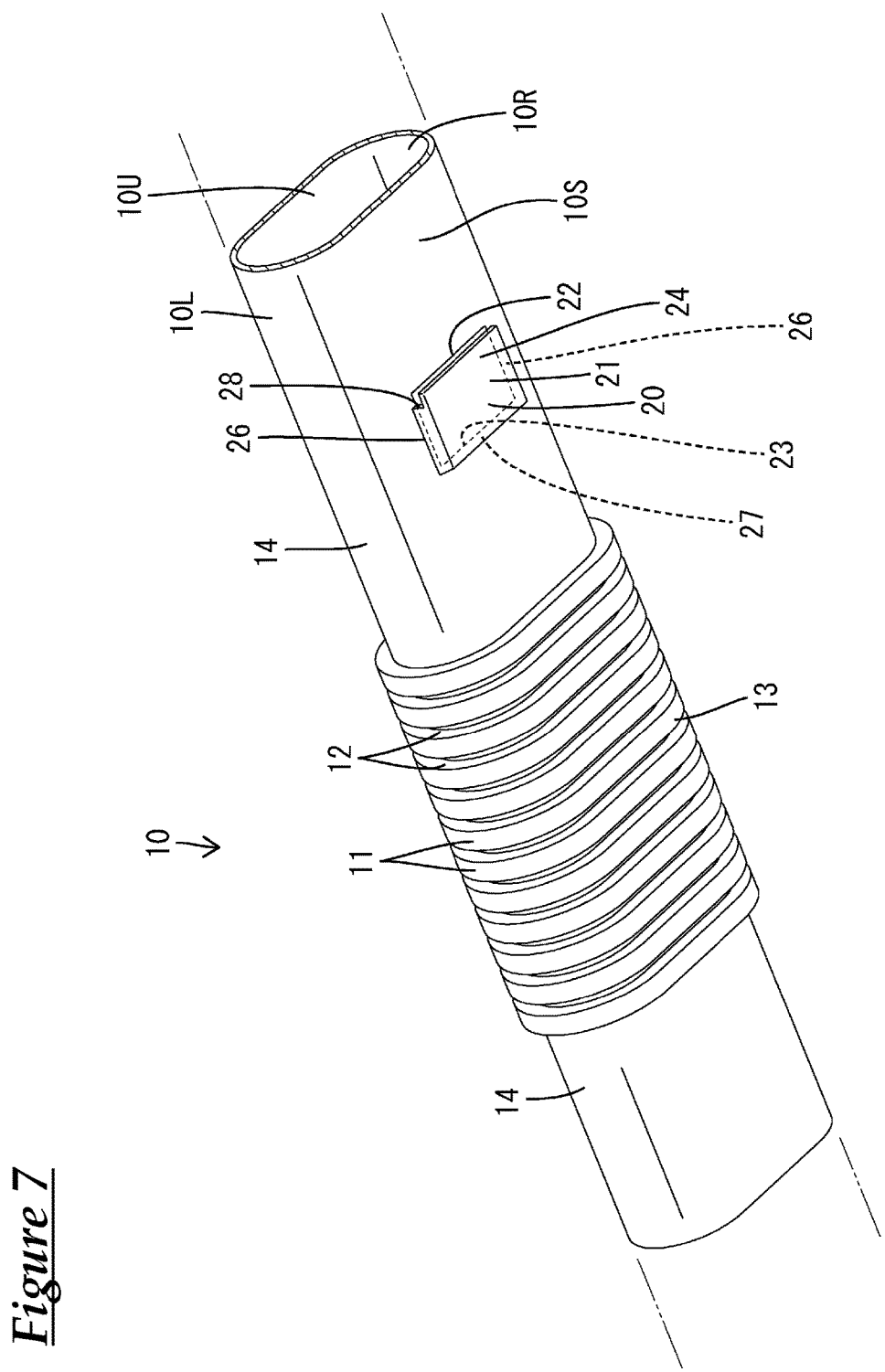
FIG. 7 is a partially enlarged perspective view of the electric wire protecting pipe showing a drain portion.

As shown in FIGS. 4 and 5, in the electric wire protecting pipe 10, the thickness (thickness in the direction from the inside to the outside) of an upper wall portion 10U and a lower wall portion 10S is greater than the thickness of a left wall portion 10L and a right wall portion 10R. That is, the upper wall portion 10U and the lower wall portion 10S of the electric wire protecting pipe 10 are thick-walled portions, and the left wall portion 10L and the right wall portion 10R are thin-walled portions.

The upper wall portion 10U and the lower wall portion 10S of the electric wire protecting pipe 10 have a constant thickness across their entire width, and the upper wall portion 10U and the lower wall portion 10S have the same thickness. Moreover, the thickness of the upper wall portion 10U and the lower wall portion 10S is thick enough to ensure a sufficient strength for protection against flying gravel or the like while the vehicle is moving. This makes it possible to protect the electric wires W from flying gravel or the like even if the electric wire protecting pipe 10 is attached to the vehicle V with the upper wall portion 10U disposed on the lower side.

The left wall portion 10L and the right wall portion 10R each have a configuration in which its thickness gradually decreases from the two end portions in the vertical direction (boundary portions to the upper wall portion 10U and the lower wall portion 10S) toward approximately a central portion in the vertical direction. Moreover, the approximately central portions in the vertical direction of the left wall portion 10L and the right wall portion 10R are thinnest portions 15 each having the smallest thickness. Note that the thickness of the left wall portion 10L is the same as the thickness of the right wall portion 10R.

The electric wire protecting pipe 10 have the same thickness in both the bending pipe portion 13 and the straight pipe portion 14. That is, in the electric wire protecting pipe 10, the thickness is constant and does not change in the axial direction, and the thickness of the portions that are part of the protruding portions 11 in the bending pipe portion 13 and the thickness of the portions that are part of the recessed portions 12 are equal to the thickness of the straight pipe portion 14.

The electric wire protecting pipe 10 is provided with a drain portion 20 for releasing inner water to the outside. As shown in FIG. 1, the drain portion 20 is provided in the vicinity of the bending pipe portion 13 disposed at the lowest position when the electric wire protecting pipe 10 is attached to the vehicle V (the end portion of the straight pipe portion 14 on the rear side of the bending pipe portion 13 disposed on the front side of the vehicle V). Accordingly, water entering the electric wire protecting pipe 10 from joints between the exterior components 30 and the electric wire protecting pipe 10 goes downward along an inner surface of the electric wire protecting pipe 10, reaches the drain portion 20, and is released to the outside.

Figure 10:
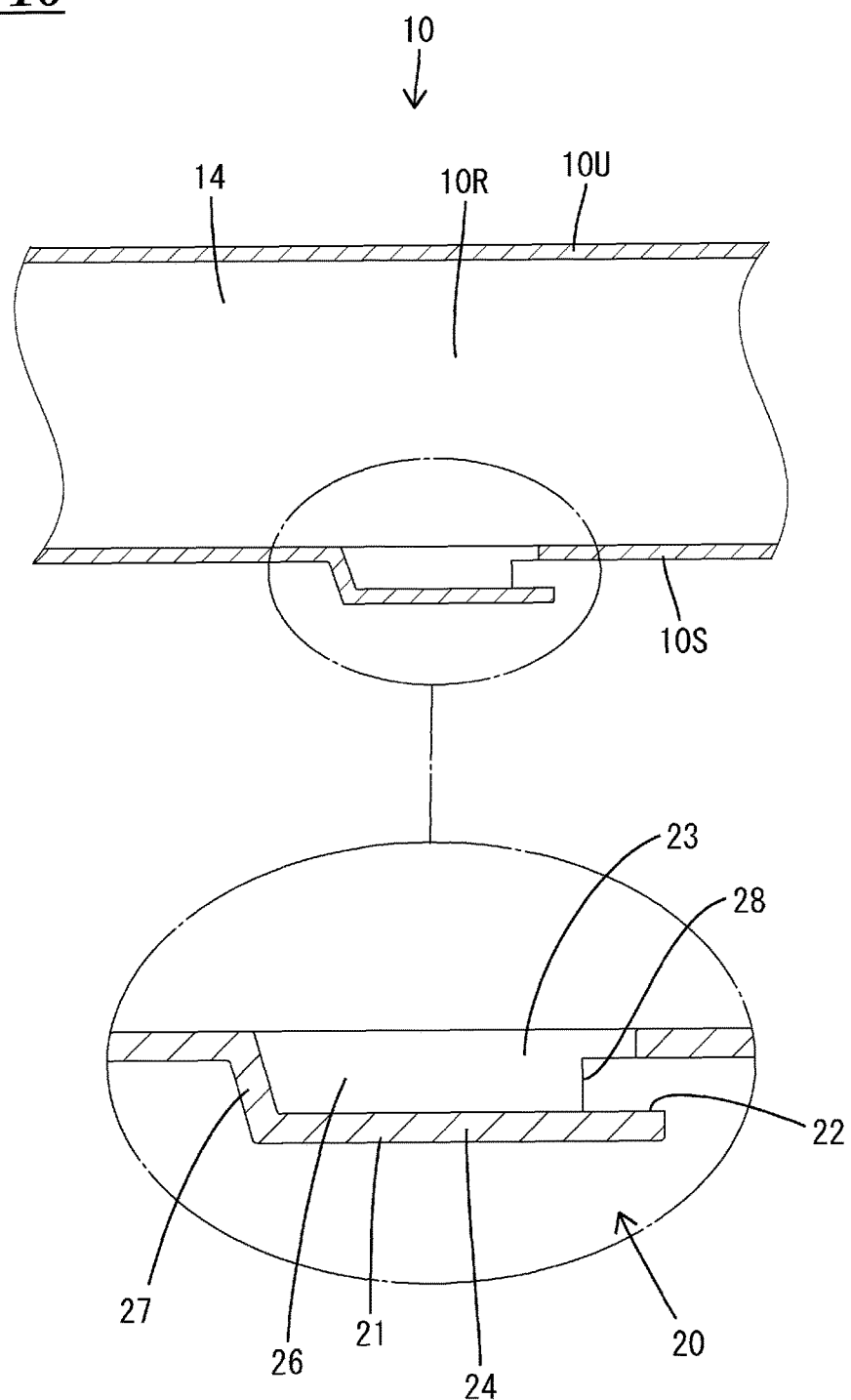
FIG. 10 is a cross-sectional view showing the drain portion, corresponding to a cross section at a position D-D in FIG. 8.

The drain portion 20 is provided integrally with the lower wall portion 10S of the electric wire protecting pipe 10. As shown in FIG. 10, the drain portion 20 has a projecting portion 21 that projects outward from the lower wall portion 10S, and its circumferential wall portion has a drain hole 22. That is, the drain portion 20 has a form in which the inside of the projecting portion 21 is provided with an opening 23 that enables communication between the inside and the outside of the electric wire protecting pipe 10. A lower wall (hereinafter, referred to as a projecting wall 24) of the projecting portion 21 is approximately parallel to the lower wall portion 10S of the straight pipe portion 14 of the electric wire protecting pipe 10.

Figure 8:
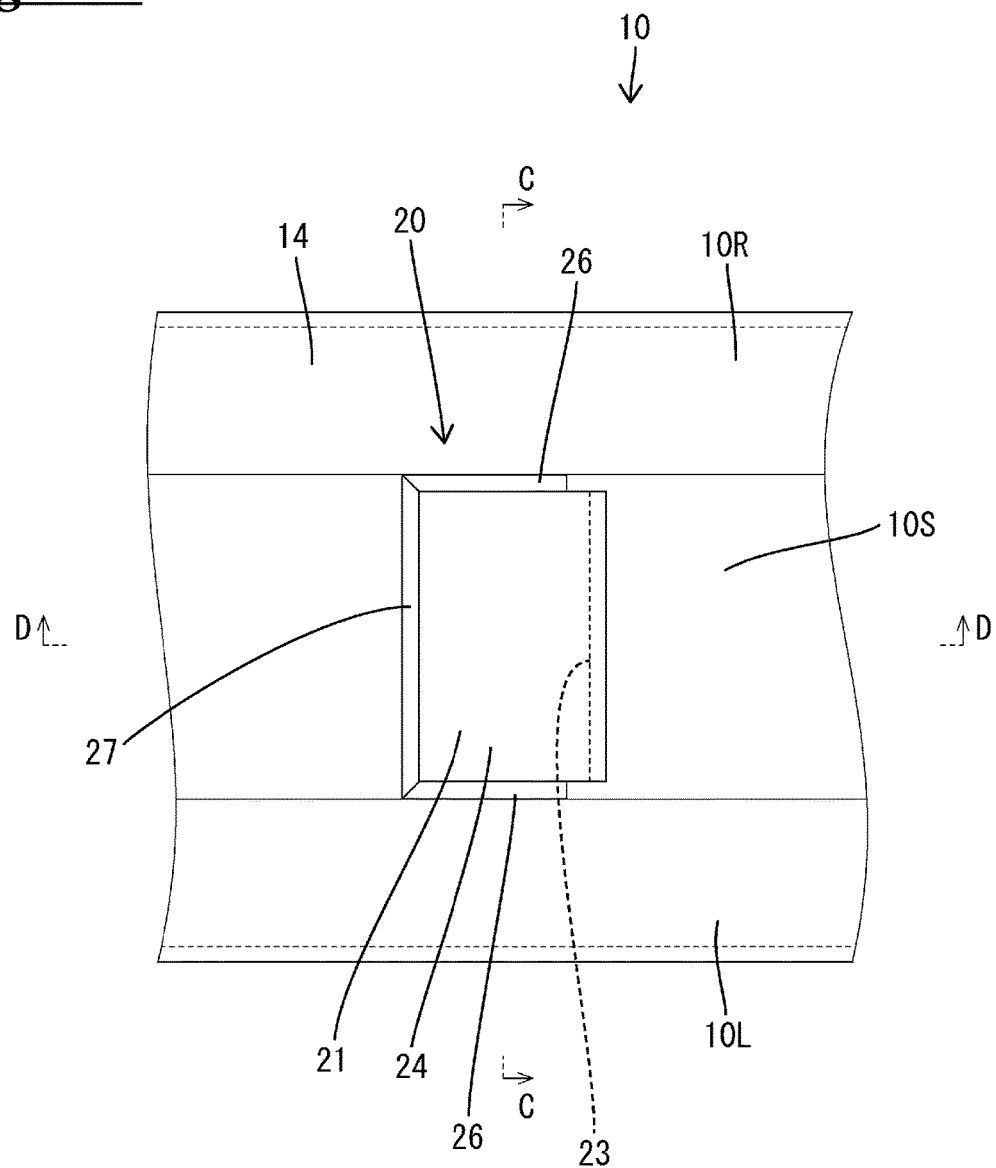
FIG. 8 is a partially enlarged bottom view of the electric wire protecting pipe showing the drain portion.
Figure 9:
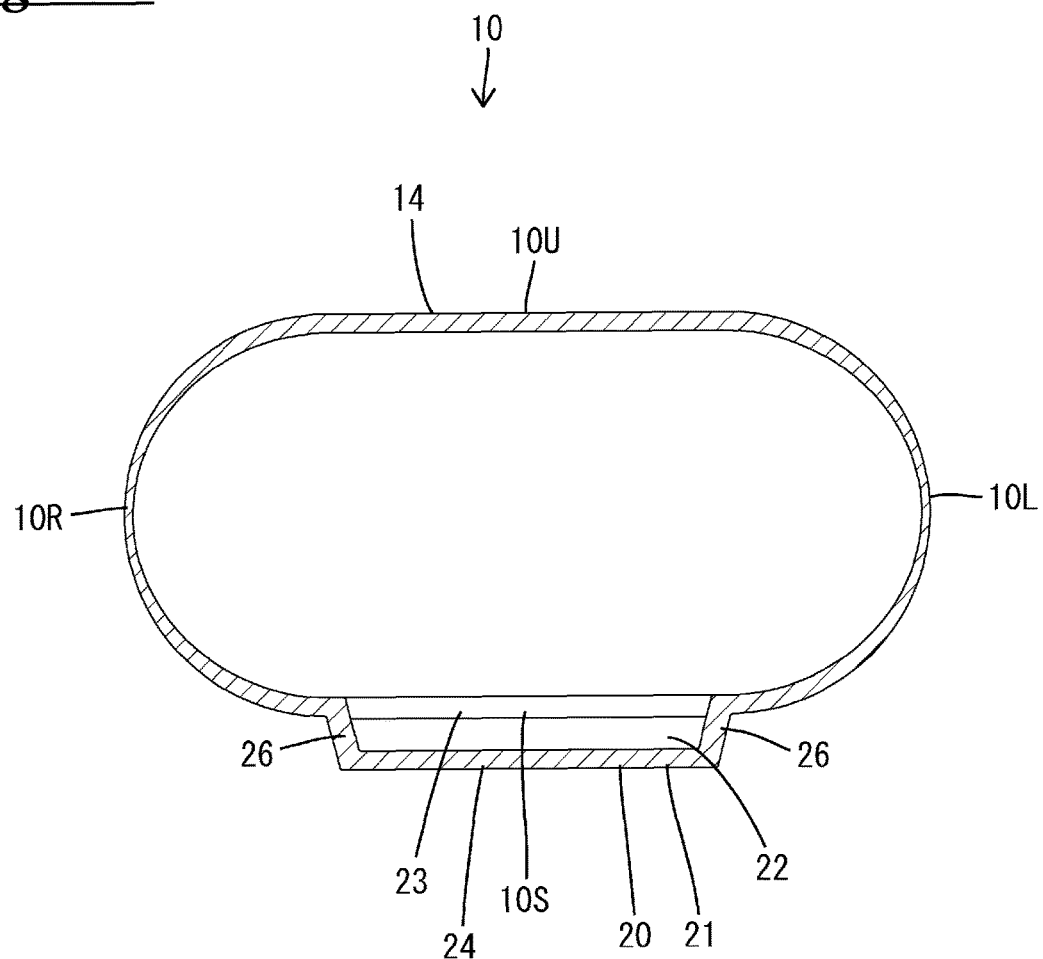
FIG. 9 is a cross-sectional view showing the drain portion, corresponding to a cross section at a position C-C in FIG. 8.

As shown in FIG. 8, when viewed from below, the projecting portion 21 has a rectangular shape that is longer in the horizontal direction, and has a width (the length in the horizontal direction) extending over approximately the entire width of the lower wall portion 10S. Moreover, the entire opening 23 is covered by the projecting wall 24, and when viewed from below, the inside of the electric wire protecting pipe 10 is not seen.

As shown in FIG. 10, the drain hole 22 is formed in a rear wall portion disposed on the rear side of the circumferential wall portion of the projecting portion 21 when the electric wire protecting pipe 10 is attached to the vehicle V. The drain hole 22 is formed in the entire rear wall portion, and approximately the entire rear surface of the projecting portion 21 is open rearward. The drain hole 22 has an approximately rectangular shape that is formed between the lower wall portion 10S of the electric wire protecting pipe 10 and the projecting wall 24, and that is narrow and elongates in the horizontal direction (see FIG. 9).

After the entire electric wire protecting pipe 10 including the projection portion 21 is integrally molded by blow molding or vacuum molding, and then the drain hole 22 is formed, thus manufacturing the electric wire protecting pipe 10. The drain hole 22 is formed by cutting the rear wall portion of the projecting portion 21 in the horizontal direction.

Side wall portions 26 on the left and right sides of the circumferential wall portion of the projecting portion 21 and a front wall portion 27 on the front side have a widening tapered shape, and thus are easily released from the mold. Also, in order to easily cut the rear wall portion, the rear wall portion of the circumferential wall of the projecting portion 21 is formed in such a manner that the rear wall portion rises approximately perpendicularly. Note that notches 28 each having a form in which the side wall portion 26 is open rearward are formed in the side wall portions 26 of the projecting portion 21 when forming the hole (see FIG. 10).

Next, the functional effects and the effects of the present embodiment having the above-described configuration will be described.

The electric wire protecting pipe 10 of the present embodiment is a resin pipe into which the electric wires W are insertable, the projecting portion 21 that projects outward is formed integrally with the lower wall portion 10S disposed on the lower side when the electric wire protecting pipe 10 is attached to the vehicle V, and the circumferential wall portion of the projecting portion 21 is provided with a drain hole 22.

With this configuration, the opening 23 that enables communication between the inside and the outside of the electric wire protecting pipe 10 is covered by the projecting portion 21 that is formed integrally with the electric wire protecting pipe 10, the electric wires W are protected from flying gravel, splashing water, or the like, and thus the electric wires W can be protected without including a separate component for shielding the drain hole 22.

Also, the drain hole 22 is formed in the rear wall portion disposed on the rear side of the circumferential wall portion of the projecting portion 21 when the electric wire protecting pipe is attached to the vehicle V. Such a configuration makes it possible to prevent draining properties from deteriorating due to wind received while the vehicle is moving.

Also, included are the bending pipe portion 13 that is easily bent and is provided with the protruding portions 11 and the recessed portions 12 that are alternately continuous with each other in the axial direction, and the straight pipe portion 14 that is flat and is not easily bent in the axial direction. With this configuration, even if the electric wire protecting pipe 10 is arranged approximately horizontally, the straight pipe portion 14 does not sag, and thus it is possible to prevent use of numerous clamps for fixing for preventing the electric wire protecting pipe from sagging and to prevent an increase in the number of clamp attachment steps.

Also, when the electric wire protecting pipe 10 is attached to the vehicle V, the thickness of the lower wall portion 10S disposed on the lower side is larger than the thickness of the left wall portion 10L and the right wall portion 10R that are disposed on the left and right sides. With such a configuration, the strength of the lower wall portion 10S that flying gravel or the like tends to hit while the vehicle is moving is high, whereas the left wall portion 10L and the right wall portion 10R that are disposed on the left and right sides easily extend, so that it is possible to prevent a hole from being formed in the electric wire protecting pipe 10 by flying gravel or the like while the vehicle is moving, and the bending pipe portion 13 easily undergoes bending deformation in the horizontal direction.

Also, the cross section that is approximately orthogonal to the axial direction has a flat shape. Such a configuration makes it possible to reduce its height, compared to cases where the cross section has a circular shape, for example, and thereby is advantageous in cases where there is a limitation on the height of an arrangement space.

Embodiment 2

Next, an electric wire protecting pipe 40 according to Embodiment 2 will be described with reference to FIGS. 11 to 14.

The electric wire protecting pipe 40 of the present embodiment differs from Embodiment 1 in that a projecting wall 41 is inclined downward toward a drain hole 22. Note that structures similar to those of Embodiment 1 are given the same reference numerals, and their redundant description will be omitted.

Figure 11:
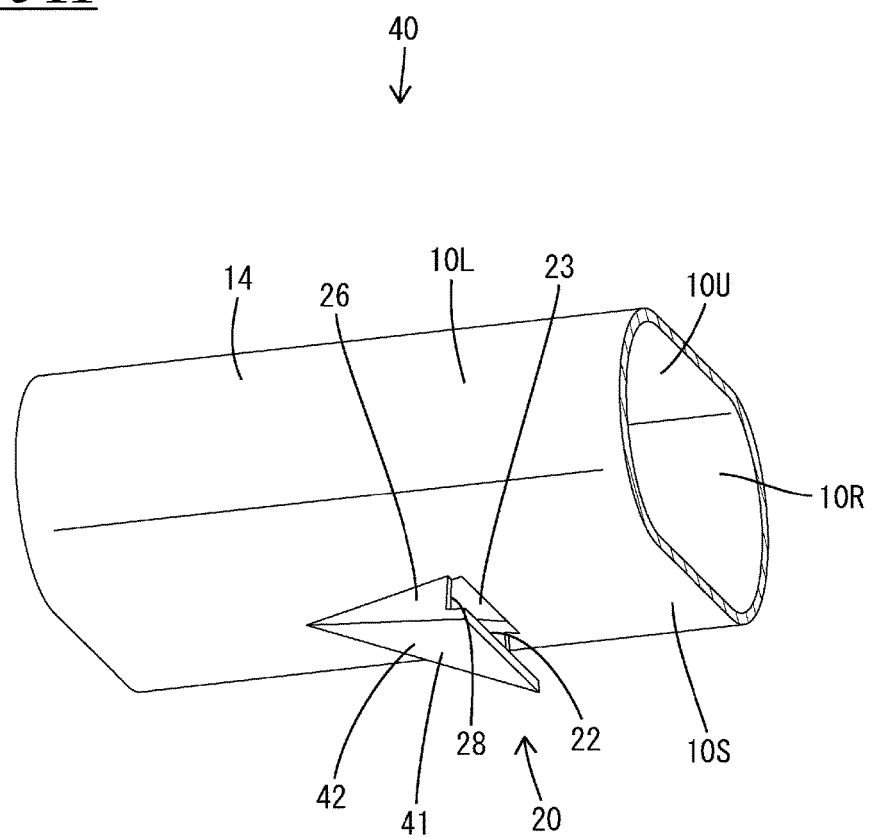
FIG. 11 shows an electric wire protecting pipe in Embodiment 2, and is a partially enlarged perspective view showing a drain portion.

Similarly to Embodiment 1, the electric wire protecting pipe 40 according to the present embodiment is a resin pipe into which the electric wires W are insertable, and as shown in FIG. 11, a projecting portion 42 that projects outward is formed integrally with a lower wall portion 10S disposed on the lower side when the electric wire protecting pipe is attached to the vehicle V, and a rear wall portion of the projecting portion 42 is provided with a drain hole 22. Also, similarly to Embodiment 1, the electric wire protecting pipe 40 includes a bending pipe portion 13 that is easily bent and is provided with protruding portions 11 and recessed portions 12 that are alternately continuous with each other in the axial direction, and a straight pipe portion 14 that is flat and is not easily bent in the axial direction. The thickness of the lower wall portion 10S is greater than the thickness of a left wall portion 10L and a right wall portion 10R, and the cross section that is approximately orthogonal to the axial direction has a flat shape.

Figure 12:
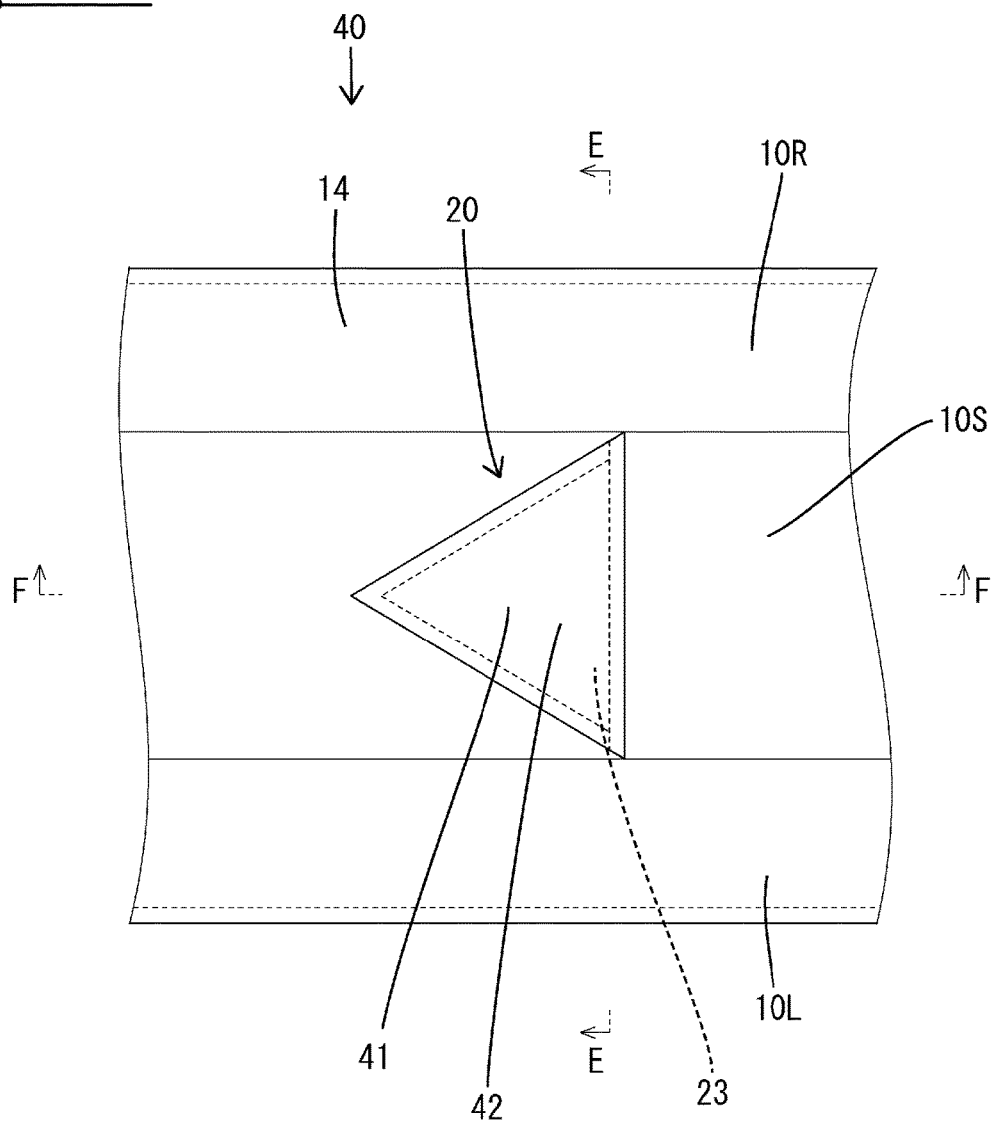
FIG. 12 is a partially enlarged bottom view of an electric wire protecting pipe showing the drain portion.
Figure 13:
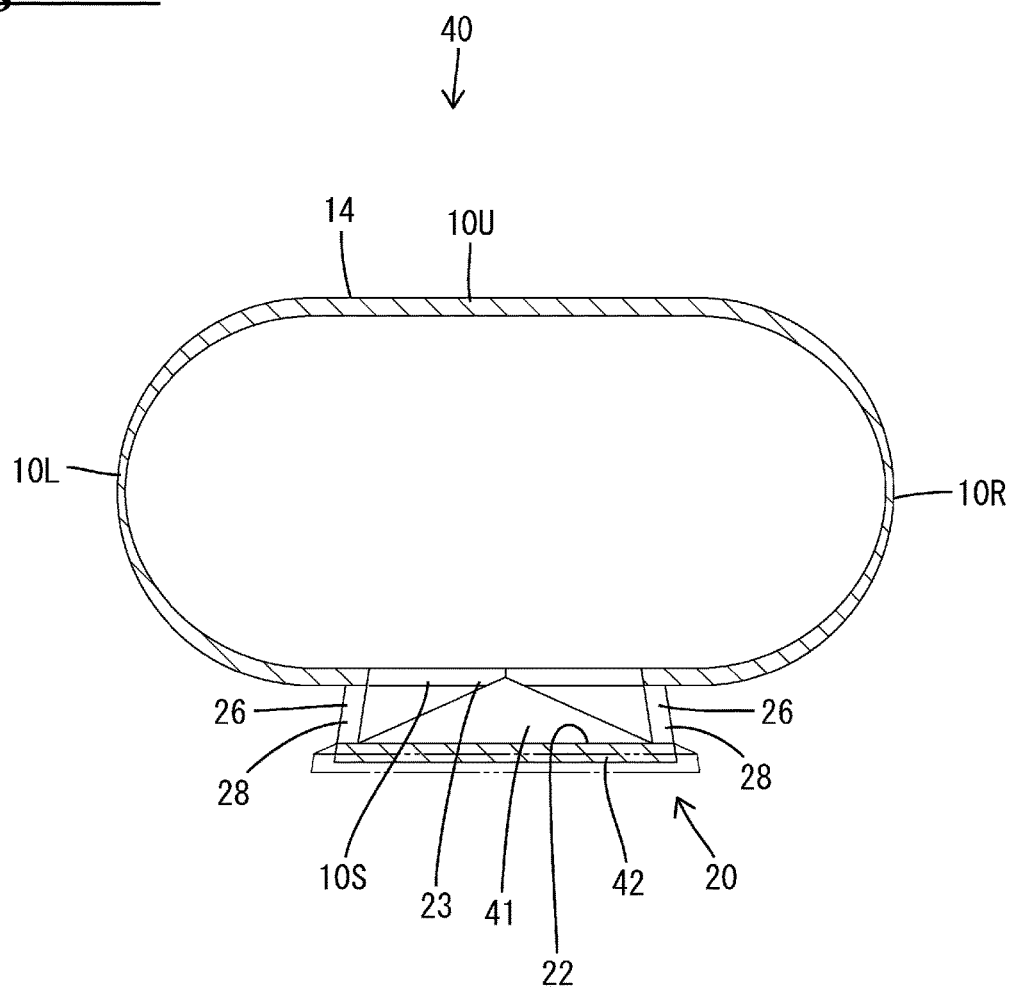
FIG. 13 is a cross-sectional view showing the drain portion, corresponding to a cross section at a position E-E in FIG. 12.

As shown in FIG. 12, when viewed from below, the projecting portion 42 has a triangular shape having a sharp front end, and has a width (length in the horizontal direction) extending across approximately the entire width of the lower wall portion 10S at its rear ends. Moreover, similarly to Embodiment 1, the entire opening 23 is covered by the projecting wall 24, and when viewed from below, the inside of the electric wire protecting pipe 40 is not seen.

Figure 14:
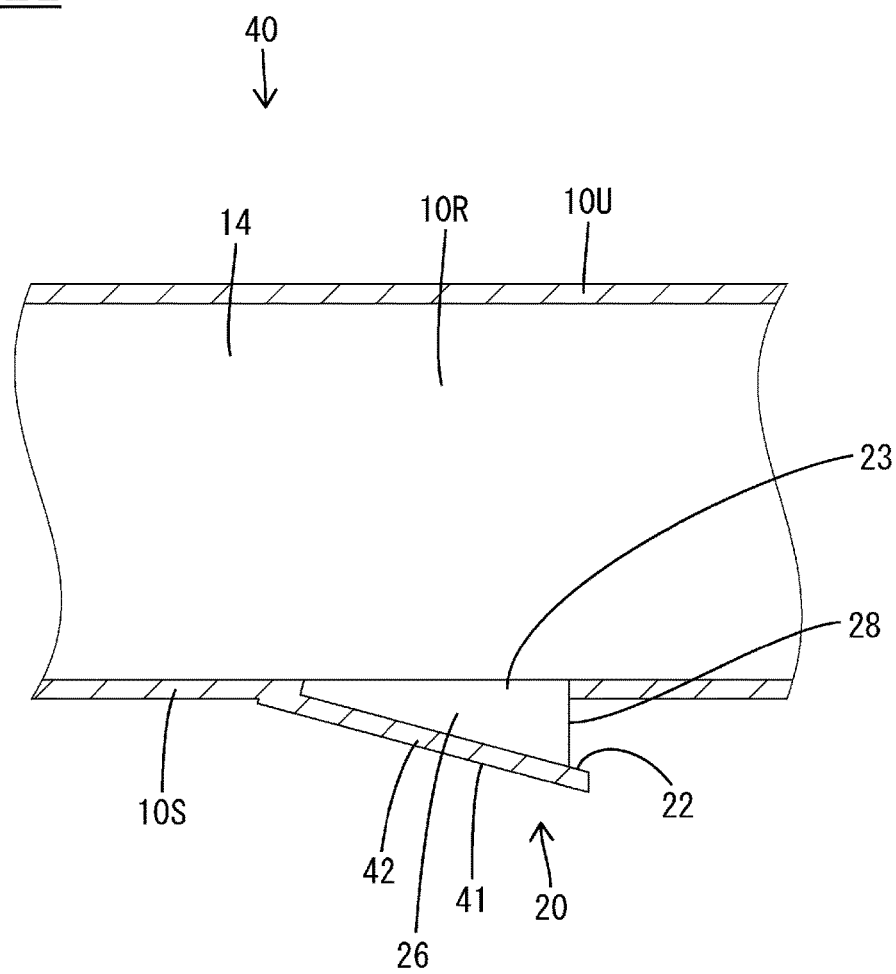
FIG. 14 is a cross-sectional view showing the drain portion, corresponding to a cross section at a position F-F in FIG. 12.

As shown in FIG. 14, the projecting wall 41 is inclined obliquely with respect to the lower wall portion 10S of the straight pipe portion 14 of the electric wire protecting pipe 40. The projecting wall 41 has an inclination, gradually falling rearward from its front end. The overall projecting wall 41 extending from the front end to the rear ends is inclined at approximately a constant gradient.

As described above, in the present embodiment, since the projecting portion 42 is formed integrally with the lower wall portion 10S, and the circumferential wall portion of the projecting portion 42 is provided with the drain hole 22, similarly to Embodiment 1, the electric wires W are protected from flying gravel, splashing water, or the like, by the projecting portion 42 formed integrally with the electric wire protecting pipe 40, and accordingly, it is possible to protect the electric wires W without including a separate component for shielding the drain hole 22.

Also, since the projecting wall 41 of the projecting portion 21 is inclined downward toward the drain hole 22, water is smoothly released to the outside due to the inclination of the projecting wall 41, thus improving its draining properties.

Other Embodiments

The present invention is not limited to the embodiments described above using the foregoing description and drawings, and embodiments such as the following are also encompassed in the technical scope of the present invention.

Figure 15:
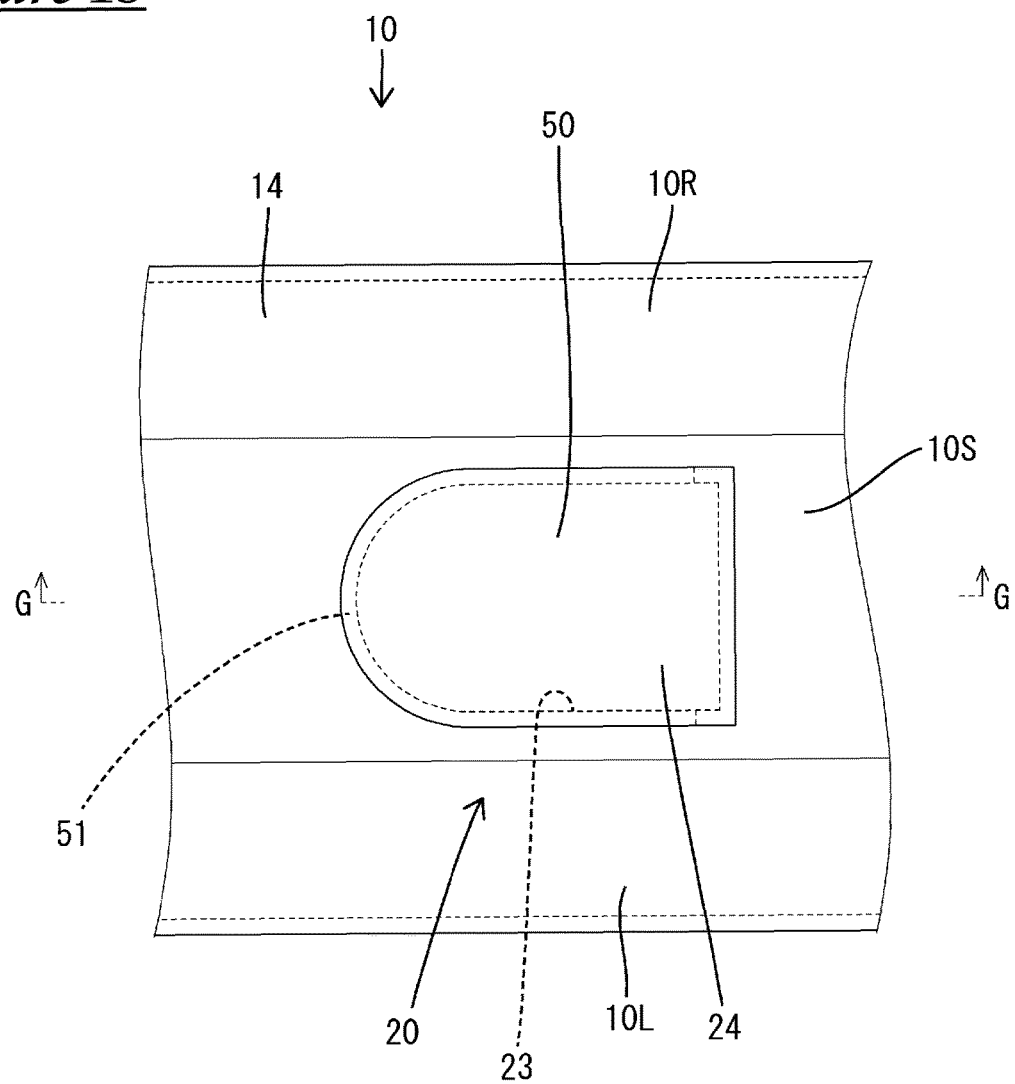
FIG. 15 is a partially enlarged bottom view of the electric wire protecting pipe showing a projecting portion in Other Embodiments (1).
Figure 16:
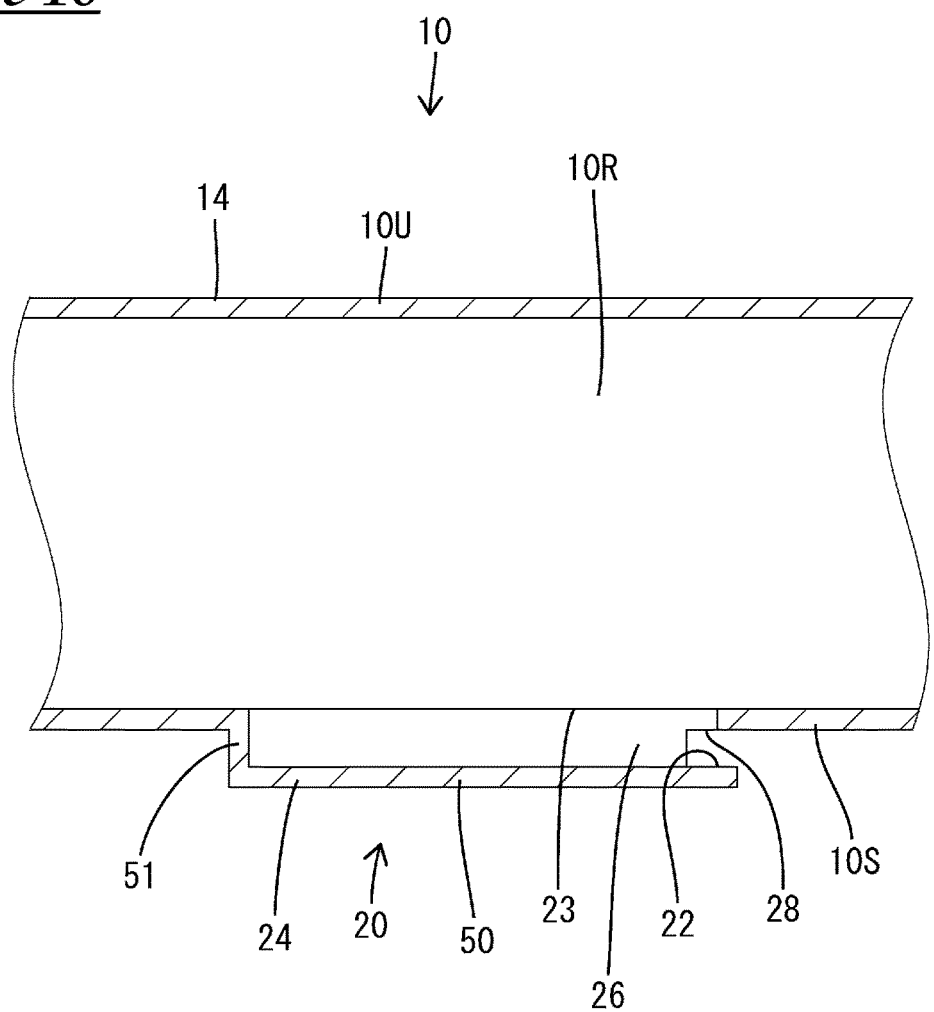
FIG. 16 is a cross-sectional view showing the projecting portion, corresponding to a cross section at a position G-G in FIG. 15.

Although in the above-described embodiments, the shape of the projecting portion 21 (42) is illustrated, the shape is not limited to this, and the configuration is possible in which the projecting portion has any shape as long as its circumferential wall portion can be provided with a drain hole, and as shown in FIGS. 15 and 16, for example, a projecting portion 50 has a shape elongated in the front-rear direction, and a front wall portion 51 has an arc shape when viewed from below.

Although in the above-described embodiments, the drain portion 20 is provided in the vicinity of the bending pipe portion 13 disposed at the lowest position of the electric wire protecting pipe 10 (40), the configuration is not limited to this, and the position at which the drain portion is provided and the number of drain portions can be changed as appropriate in accordance with a path for routing electric wires or the like.

Although in the above-described embodiments, a pair of bending pipe portions 13 are provided on the front and rear sides, the configuration is not limited to this, and positions of the bending pipe portions and the straight pipe portion, their lengths, and the like can be changed as appropriate in accordance with the path for routing electric wires.

Although in the above-described embodiments, the drain hole 22 is formed in the rear wall portion of the projecting portion 21, the configuration is not limited to this, and the drain hole may also be provided in the side wall portions or the front wall portion of the projecting portion.

Although in the above-described embodiments, the electric wire protecting pipe 10 (40) includes the bending pipe portions 13 and the straight pipe portion 14, the configuration is not limited to this, and the present design can also be applied to an electric wire protecting pipe that does not include a bending pipe portion.

Although in the above-described embodiments, the thickness of the lower wall portion 10S of the electric wire protecting pipe 10 (40) is greater than the thickness of the left wall portion 10L and the right wall portion 10R, the configuration is not limited to this, and the overall circumference may have a constant thickness, for example.

Although in the above-described embodiments, the cross-sectional shape of the electric wire protecting pipe 10 (40) is obround, it is not limited to this, and the cross-sectional shape of an electric wire protecting pipe may be any shape such as a circular shape, a square shape, a flat rectangular shape, or an elliptic shape, for example.

Although in the above-described embodiments, the drain hole 22 is formed over the entire rear wall portion of the projecting portion 21, the configuration is not limited to this, and the drain hole may also be formed only in a portion of the rear wall portion.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

V Vehicle
W Electric wire
10, 40 Electric wire protecting pipe
10L Left wall portion
10R Right wall portion
10S Lower wall portion
11 Protruding portion
12 Recessed portion
13 Bending pipe portion
14 Straight pipe portion
21, 42, 50 Projecting portion
22 Drain hole
41 Projecting wall (lower wall of projecting portion)

The invention claimed is:

1. An electric wire protecting pipe that is a resin pipe into which electric wires are insertable, comprising:
a lower wall portion is disposed on a lower side when the electric wire protecting pipe is attached to a vehicle, the lower wall portion includes an opening,
a drain portion integrally formed in the lower wall portion by blow molding or vacuum molding such that the drain portion extends from and is made from the same resin material as the lower wall portion, the drain portion includes a projecting portion,
the projecting portion projects outward from the lower wall portion such that it covers the opening in the lower wall portion, the projecting portion includes a circumferential wall portion, and
the circumferential wall portion is provided with a drain hole that is open in a direction intersecting a direction from the inside to the outside of the electric wire protecting pipe.

2. The electric wire protecting pipe according to claim 1, wherein the drain hole is formed in a wall portion of the circumferential wall portion of the projecting portion that is disposed on a rear side when the electric wire protecting pipe is attached to the vehicle.

3. The electric wire protecting pipe according to claim 1, comprising:
a bending pipe portion that is easily bent and is provided with protruding portions and recessed portions that are alternately continuous with each other in an axial direction; and
a straight pipe portion that is flat and is not easily bent in the axial direction.

4. The electric wire protecting pipe according to claim 1, whose cross section that is approximately orthogonal to the axial direction has a flat shape.

5. The electric wire protecting pipe according to claim 1, wherein a lower wall of the projecting portion is inclined downward toward the drain hole.

6. The electric wire protecting pipe according to claim 1, comprising:
a bending pipe portion that is easily bent and is provided with protruding portions and recessed portions that are alternately continuous with each other in an axial direction; and
a straight pipe portion that is flat and is not easily bent in the axial direction,
wherein a thickness of the lower wall portion is greater than a thickness of a left wall portion and a right wall portion that are disposed on left and right sides.

7. A wire harness in which a plurality of electric wires are inserted into the electric wire protecting pipe according to claim 1.

* * * * *